(12) United States Patent
Inoue et al.

(10) Patent No.: US 12,049,955 B2
(45) Date of Patent: Jul. 30, 2024

(54) CONTROL APPARATUS

(71) Applicant: SUBARU CORPORATION, Tokyo (JP)

(72) Inventors: Kenji Inoue, Tokyo (JP); Akihiro Kawakami, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/368,893

(22) Filed: Sep. 15, 2023

(65) Prior Publication Data

US 2024/0102551 A1 Mar. 28, 2024

(30) Foreign Application Priority Data

Sep. 27, 2022 (JP) ................. 2022-154049

(51) Int. Cl.
| | | |
|---|---|---|
| *F16H 59/02* | (2006.01) | |
| *F16H 59/18* | (2006.01) | |
| *F16H 59/44* | (2006.01) | |
| *F16H 59/66* | (2006.01) | |
| *F16H 61/16* | (2006.01) | |
| *F16H 61/18* | (2006.01) | |

(52) U.S. Cl.
CPC ......... *F16H 59/0204* (2013.01); *F16H 59/18* (2013.01); *F16H 59/44* (2013.01); *F16H 61/16* (2013.01); *F16H 61/18* (2013.01); *F16H 2059/663* (2013.01)

(58) Field of Classification Search
CPC ...... F16H 59/0204; F16H 59/18; F16H 59/44; F16H 2059/663; F16H 61/16; F16H 61/18
See application file for complete search history.

(56) References Cited

U.S. PATENT DOCUMENTS

| | | | |
|---|---|---|---|
| 8,649,949 B2 * | 2/2014 | Nishida | F16H 61/0213 701/52 |
| 8,886,420 B2 * | 11/2014 | Shibata | F16H 61/0204 701/52 |
| 2005/0125134 A1 * | 6/2005 | Iwatsuki | B60T 8/1755 701/54 |
| 2012/0310497 A1 * | 12/2012 | Haneda | F16H 61/0202 701/52 |

FOREIGN PATENT DOCUMENTS

JP     2008-115964 A     5/2008

* cited by examiner

*Primary Examiner* — Huan Le
(74) *Attorney, Agent, or Firm* — TROUTMAN PEPPER HAMILTON SANDERS LLP (57) ABSTRACT

A control apparatus includes a controller that switches a transmission mode of a transmission of a vehicle between an automatic shift mode and a temporary manual shift mode; and a storage unit storing maps each representing a relationship between a vehicle speed and an accelerator operation amount that are parameters for switching the transmission mode, and that are set for individual gradients of road on which the vehicle drives. The maps each include a cancellation region, a first maintenance region, and a second maintenance region, which are set to be different from each other according to the gradients. The controller includes a processor(s) and a memory(ies) coupled to the processor(s). The processor(s) executes a process including: selecting a map corresponding to a gradient of road on which the vehicle is driving; and switching the transmission mode based on the selected map, the vehicle speed and the accelerator operation amount.

8 Claims, 8 Drawing Sheets

| | DOWNHILL ROADS | FLAT ROADS | UPHILL ROADS |
|---|---|---|---|
| FIRST PREDETERMINED TIME | 2 sec | 2 sec | 2 sec |
| SECOND PREDETERMINED TIME | 0.1 sec | 0.5 sec | 0.2 sec |

CONTROL APPARATUS

CROSS-REFERENCE TO RELATED APPLICATION

The present application claims priority from Japanese Patent Application No. 2022-154049 filed on Sep. 27, 2022, the entire contents of which are hereby incorporated by reference.

BACKGROUND

The disclosure relates to a control apparatus.

For vehicles equipped with automatic transmissions, in order to enable driving adapted to each driver's sensitivity, such as fuel-efficient driving and sporty driving, there has been technology configuring the automatic transmissions so that, despite being automatic transmissions, the gear stage is manually selectable as appropriate by the driver.

For example, Japanese Unexamined Patent Application Publication (JP-A) No. 2008-115964 discloses technology in which, when the driver operates a paddle shifter switch during an automatic shift mode in which the gear ratio of an automatic transmission is automatically controlled, a temporary manual shift mode in which the gear ratio of the automatic transmission is temporarily shifted is executed. Execution of the temporary manual shift mode makes it possible to temporarily realize driving adapted to each driver's sensitivity in vehicles equipped with an automatic transmission.

JP-A No. 2008-115964 provides a return condition for automatically canceling the temporary manual shift mode and returning to the automatic shift mode. With the return condition, the mode is automatically switched from the temporary manual shift mode to the automatic shift mode. This dispenses the driver from performing a manual operation to switch from the temporary manual shift mode to the automatic shift mode, thereby reducing complexity.

SUMMARY

An aspect of the disclosure provides a control apparatus including: a controller configured to switch a transmission mode of a transmission of the vehicle between an automatic shift mode in which a gear ratio of the transmission is automatically controlled and a temporary manual shift mode in which the gear ratio of the transmission is temporarily shifted in response to an operation performed by a driver who drives the vehicle; and a storage unit configured to store multiple types of maps each representing a relationship between a vehicle speed and an accelerator operation amount of the vehicle that are parameters for switching the transmission mode, the multiple types of maps being set for individual gradients of road on which the vehicle drives. The multiple types of maps each include: a cancellation region representing a range of vehicle speeds and accelerator operation amounts at which the temporary manual shift mode is canceled; a first maintenance region that is a region on a side where accelerator operation amounts are less than the cancellation region and that represents a range of vehicle speeds and accelerator operation amounts at which the temporary manual shift mode is maintained; and a second maintenance region that is a region on a side where accelerator operation amounts are greater than the cancellation region and that represents a range of vehicle speeds and accelerator operation amounts at which the temporary manual shift mode is maintained. The cancellation region, the first maintenance region, and the second maintenance region in each of the multiple types of maps are set to be different from each other according to the gradients. The controller includes one or more processors, and one or more memories coupled to the one or more processors. The one or more processors execute a process including: selecting, from the multiple types of maps, a map corresponding to a gradient of road on which the vehicle is driving; and switching the transmission mode of the transmission based on the selected map, the vehicle speed and the accelerator operation amount.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Previously, as a return condition for canceling the temporary manual shift mode and returning to the automatic shift mode, a cancellation region has been set to cancel the temporary manual shift mode in a map of vehicle speed and accelerator operation amount.

However, depending on the driving state of the vehicle, such as driving on an uphill road, a flat road, or a downhill road, the region where the driver wants to cancel the temporary manual shift mode, the region where the driver wants to hold the temporary manual shift mode, and the region where the driver wants to immediately cancel the temporary manual shift mode are different. Nevertheless, in the switching control of the transmission mode of the related art, it has been difficult to cancel the temporary manual shift mode so as to match the driver's sensitivity and to perform return processing to return to the automatic shift mode.

It is desirable to provide a control apparatus capable of performing processing to switch the transmission mode so as to match the driver's sensitivity.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
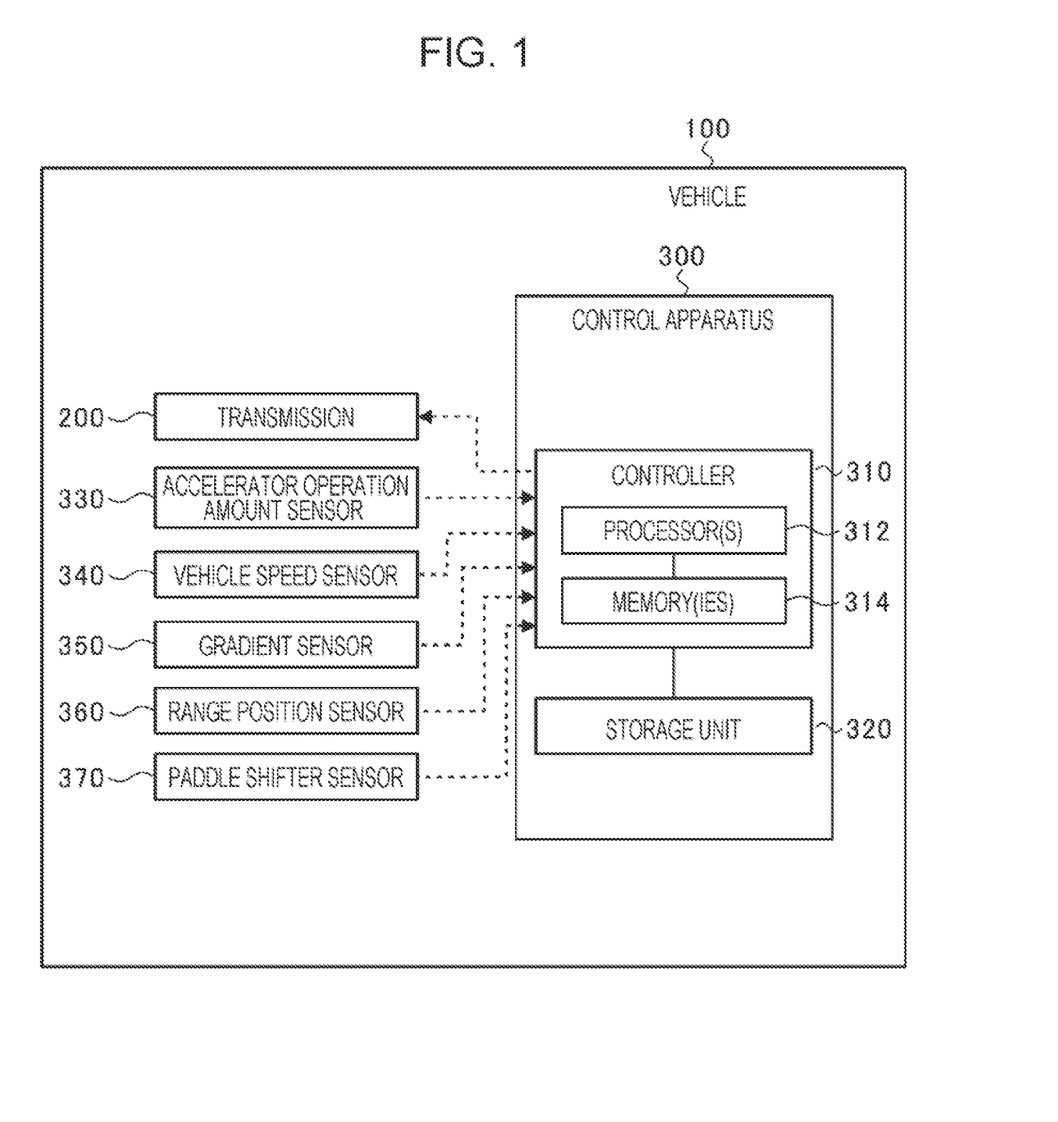
FIG. 1 is a schematic diagram illustrating the configuration of a vehicle according to an embodiment.

FIG. 1 is a schematic diagram illustrating the configuration of a vehicle 100 according to the present embodiment. The vehicle 100 is equipped with a transmission 200 and a control apparatus 300 configured to control the transmission 200. The transmission 200 changes a rotational speed (rpm) input from an engine or a motor (not illustrated) installed in the vehicle 100 at a certain gear ratio. The control apparatus 300 includes a controller 310 and a storage unit 320.

The controller 310 includes one or more processors 312, and one or memories 314 coupled to the processor(s) 312. The memory(ies) 314 include a read-only memory (ROM) storing a program and the like, and a random-access memory (RAM) serving as a work area. The processor(s) 312 of the controller 310 cooperates with the program included in the memory(ies) 314 to control the transmission 200. The operation of the controller 310 will be described in detail later.

An accelerator operation amount sensor 330, a vehicle speed sensor 340, a gradient sensor 350, a range position sensor 360, and a paddle shifter sensor 370 are coupled to the controller 310. The accelerator operation amount sensor 330 is configured to detect an accelerator operation amount, which is the depressed amount of an accelerator pedal (not illustrated). The vehicle speed sensor 340 is configured to detect the vehicle speed of the vehicle 100. The gradient sensor 350 is configured to detect the gradient of road on which the vehicle 100 drives.

The range position sensor 360 is an example of a detector configured to detect a range position, such as a parking range (P), a reverse range (R), a neutral range (N), a drive range (D), etc. specified by a gear stick (not illustrated). The gear stick is an example of an operation member for switching the range position. By operating the gear stick, the driver can manually switch the range position to a desired range.

The paddle shifter sensor 370 is an example of a detector configured to detect the driver's operation on a paddle shifter (not illustrated). The paddle shifter is an example of an operation member for manually switching the gear ratio of the automatic transmission. By operating the paddle shifter, the driver can manually switch the gear ratio of the automatic transmission to a desired gear ratio. The paddle shifter is a member provided, for example, on the steering wheel of the vehicle 100, and with the paddle shifter, the driver performs a upshift or downshift operation. The paddle shifter sensor 370 detects an upshift or downshift operation performed by the driver.

The controller 310 controls the gear ratio and the transmission mode of the transmission 200. The controller 310 switches the transmission mode of the transmission 200 between an automatic shift mode in which the gear ratio of the transmission 200 is automatically controlled and a temporary manual shift mode in which the gear ratio of the transmission 200 is temporarily shifted in response to the driver's operation during the automatic shift mode.

In one example, the automatic shift mode is a mode in which, when the range position is in the drive range (D), the gear ratio of the transmission 200 is automatically controlled based on a transmission map in which the accelerator operation amount and the vehicle speed are associated.

The temporary manual shift mode is a mode in which, when the driver manually operates the paddle shifter during the automatic shift mode, the gear ratio set in the automatic shift mode is temporarily upshifted or downshifted. The detailed control content of the controller 310, which is configured to switch between the automatic shift mode and the temporary manual shift mode, will be described in detail later.

In the present embodiment, driving adapted to each person's sensitivity, such as fuel-efficient driving and sporty driving, can be realized through the driver's shift operation in the temporary manual shift mode. In the temporary manual shift mode, in order to dispense the driver from a switching operation to manually cancel the temporary manual shift mode and return to the automatic shift mode, a return condition is provided to automatically return to the automatic shift mode from the temporary manual shift mode.

With the return condition, the mode is automatically switched from the temporary manual shift mode to the automatic shift mode. This dispenses the driver from the need to manually switch the transmission mode, thereby reducing complexity.

In the present embodiment, the return condition is set with a vehicle speed and an accelerator operation amount as parameters. In one example, a mode switching map representing the relationship between a vehicle speed and an accelerator operation amount is stored in the storage unit 320, and, as the return condition, a cancellation region for canceling the temporary manual shift mode is set in the mode switching map. When the vehicle speed and the accelerator operation amount of the vehicle 100 are within the cancellation region for a predetermined time, the controller 310 cancels the temporary manual shift mode and performs return processing to return to the automatic shift mode.

However, depending on the driving state of the vehicle 100, such as driving on an uphill road, a flat road, or a downhill road, the region in the mode switching map where the driver wants to cancel the temporary manual shift mode, the region where the driver wants to hold the temporary manual shift mode, and the region where the driver wants to immediately cancel the temporary manual shift mode are different.

Accordingly, in the present embodiment, multiple types of mode switching maps are set for the individual gradients of road on which the vehicle 100 drives, and the multiple types of mode switching maps are stored in the storage unit 320. Then, in response to the detection result of the gradient sensor 350, the controller 310 refers to the mode switching maps stored in the storage unit 320, thereby canceling the temporary manual shift mode to match the driver's sensitivity and realizing return processing to return to the automatic shift mode. Hereinafter, the multiple types of mode switching maps set for the individual gradients of road in the present embodiment will be described.

Figure 2:
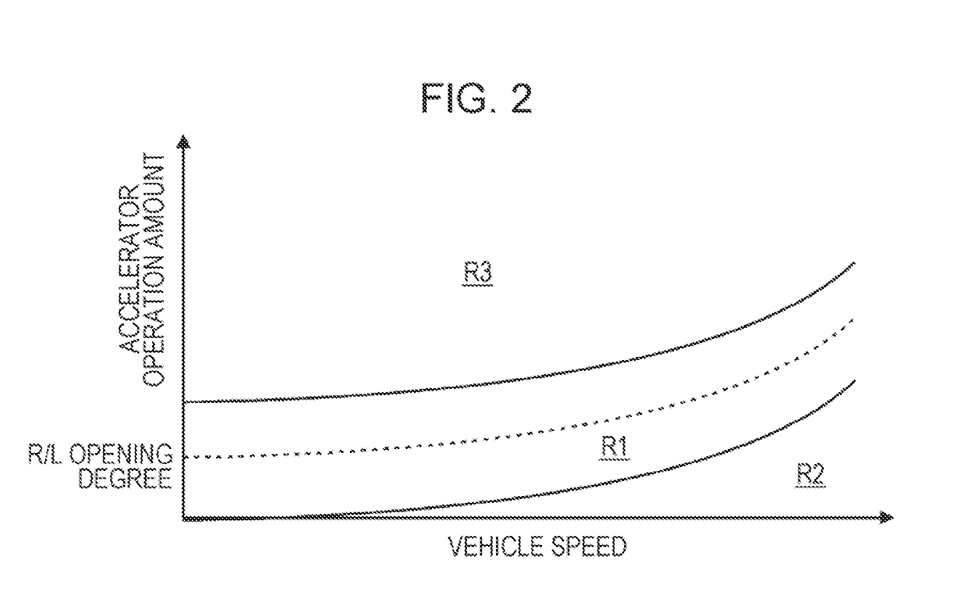
FIG. 2 is a diagram of a mode switching map for flat roads.

FIG. 2 is a diagram of a mode switching map for flat roads. As illustrated in FIG. 2, the mode switching map for flat roads includes a cancellation region R1, a first maintenance region R2, and a second maintenance region R3.

The cancellation region R1 is a region in the mode switching map representing vehicle speeds and accelerator operation amounts at which the temporary manual shift mode is canceled. The cancellation region R1 is set based on a road load opening degree (R/L opening degree), which is an accelerator operation amount necessary for the vehicle 100 to drive on a road with a certain gradient at a constant vehicle speed. The road load opening degree is an opening degree that differs according to the gradient of the road. Therefore, the cancellation region R1 in each of the mode switching maps for flat roads, downhill roads, and uphill roads is set based on the road load opening degree and the gradient of the road.

In addition, the road load opening degree is an opening degree that differs according to the gear ratio of the transmission 200. The cancellation region R1 is a region that contains all the road load opening degrees of the individual gear ratios. The upper side of the cancellation region R1 for flat roads is set based on the road load opening degree when the driver performs a downshift operation, with a margin for the accelerator operation amount being set according to the driver's sensitivity. The lower side of the cancellation region R1 for flat roads is set to be less than or equal to the road load opening degree of the lowest gear stage where the driver can downshift.

The first maintenance region R2 is a region on the side where the accelerator operation amounts are less than those in the cancellation region R1, and represents a range of vehicle speeds and accelerator operation amounts at which the temporary manual shift mode is maintained. The second maintenance region R3 is a region on the side where the accelerator operation amounts are greater than those in the cancellation region R1, and represents a range of vehicle speeds and accelerator operation amounts at which the temporary manual shift mode is maintained.

Figure 3:
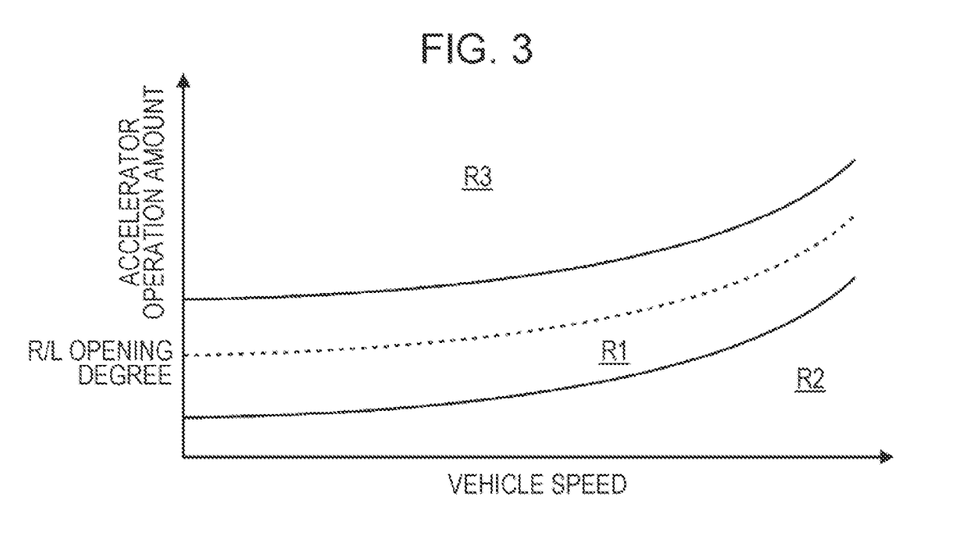
FIG. 3 is a diagram of a mode switching map for uphill roads.

FIG. 3 is a diagram of a mode switching map for uphill roads. As illustrated in FIG. 3, the mode switching map for uphill roads includes the cancellation region R1, the first maintenance region R2, and the second maintenance region R3, like the mode switching map for flat roads.

The cancellation region R1 in the mode switching map for uphill roads is a region different from the cancellation region R1 in the mode switching map for flat roads illustrated in FIG. 2. In one example, the cancellation region R1 in the mode switching map for uphill roads is a region on the side where the accelerator operation amounts are greater than those in the cancellation region R1 in the mode switching map for flat roads.

This is because it is necessary to increase the accelerator operation amount on uphill roads compared to flat roads in order for the vehicle 100 to drive at a constant vehicle speed, and the road load opening degree on uphill roads is greater than the road load opening degree on flat roads.

The upper side of the cancellation region R1 for uphill roads is set based on the road load opening degree when the driver performs a downshift operation, with a margin for the accelerator operation amount being set according to the driver's sensitivity. The lower side of the cancellation region R1 for uphill roads is set to be less than or equal to the road load opening degree of the lowest gear stage where the driver can downshift.

The first maintenance region R2 is a region on the side where the accelerator operation amounts are less than those in the cancellation region R1, and represents a range of vehicle speeds and accelerator operation amounts at which the temporary manual shift mode is maintained. The second maintenance region R3 is a region on the side where the accelerator operation amounts are greater than those in the cancellation region R1, and represents a range of vehicle speeds and accelerator operation amounts at which the temporary manual shift mode is maintained.

Figure 4:
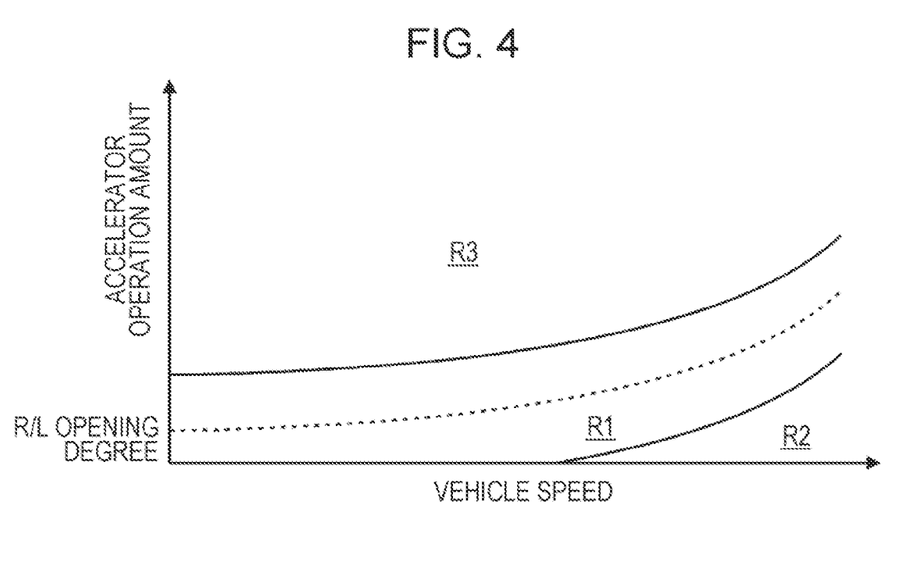
FIG. 4 is a diagram of a mode switching map for downhill roads.

FIG. 4 is a diagram of a mode switching map for downhill roads. As illustrated in FIG. 4, the mode switching map for downhill roads includes the cancellation region R1, the first maintenance region R2, and the second maintenance region R3, like the mode switching map for flat roads.

The cancellation region R1 in the mode switching map for downhill roads is a region different from the cancellation region R1 in the mode switching map for flat roads illustrated in FIG. 2. In one example, the cancellation region R1 in the mode switching map for downhill roads is a region on the side where the accelerator operation amounts are less than those in the cancellation region R1 in the mode switching map for flat roads.

This is because it is necessary to reduce the accelerator operation amount on downhill roads compared to flat roads in order for the vehicle 100 to drive at a constant vehicle speed, and the road load opening degree on downhill roads is less than the road load opening degree on flat roads.

The upper side of the cancellation region R1 for downhill roads may be set to, for example, the road load opening degree or less during corner turning because the driver may perform a downshift operation just before the corner and then perform an accelerator operation so as to keep the rotation during corner turning. The lower side of the cancellation region R1 for downhill roads is set to include, for example, the range of accelerator operation amounts 0 to 1 so that the accelerator can be stepped on, since the driver may perform an operation to accelerate the accelerator after a downshift operation.

The first maintenance region R2 is a region on the side where the accelerator operation amounts are less than those in the cancellation region R1, and represents a range of vehicle speeds and accelerator operation amounts at which the temporary manual shift mode is maintained. The second maintenance region R3 is a region on the side where the accelerator operation amounts are greater than those in the cancellation region R1, and represents a range of vehicle speeds and accelerator operation amounts at which the temporary manual shift mode is maintained.

Referring back to FIG. 1, the storage unit 320 stores a transmission map for the automatic shift mode and multiple types of mode switching maps for the temporary manual shift mode. As described above, the storage unit 320 stores multiple types of mode switching maps which are maps each representing a relationship between a vehicle speed and an accelerator operation amount that are parameters for switching the transmission mode, and which are set for the individual gradients of the road on which the vehicle 100 drives.

As described above, the multiple types of mode switching maps each include the cancellation region R1, the first maintenance region R2, and the second maintenance region R3. In each of the multiple types of mode switching maps, the cancellation region R1 is a region representing the range of vehicle speeds and accelerator operation amounts at which the temporary manual shift mode is canceled.

Moreover, the first maintenance region R2 is a region on the side where the accelerator operation amounts are less than those in the cancellation region R1, and represents a range of vehicle speeds and accelerator operation amounts at which the temporary manual shift mode is maintained. The second maintenance region R3 is a region on the side where the operation amounts are greater than those in the cancellation region R1, and represents a range of vehicle speeds and accelerator operation amounts at which the temporary manual shift mode is maintained. As has been described with reference to FIGS. 2 to 4, the cancellation regions R1, the first maintenance regions R2, and the second maintenance regions R3 in the multiple types of maps are set to be different from each other according to the gradients.

In the automatic shift mode, the controller 310 reads the transmission map stored in the storage unit 320 and automatically controls the gear ratio of the transmission 200 based on the transmission map read. In the temporary manual shift mode, the controller 310 estimates the gradient of the road on which the vehicle 100 drives based on the detection result of the gradient sensor 350. Note that this is not the only possible case, and the controller 310 may detect the gradient of the road on which the vehicle 100 drives based on, for example, the detection result of a detection sensor configured to directly detect the gradient of the road on which the vehicle 100 drives. Alternatively, the controller 310 may obtain the gradient of the road on which the vehicle 100 drives by, for example, receiving information on the gradient from map information of the global positioning system (GPS) or a car navigation system. Then, the controller 310 selects a mode switching map according to the estimated gradient from the multiple types of mode switching maps stored in the storage unit 320, and, based on the selected mode switching map and the vehicle speed and the accelerator operation amount of the vehicle 100, switches the transmission mode of the transmission 200.

In one example, the controller 310 cancels the temporary manual shift mode and performs return processing to return to the automatic shift mode when a predetermined time consecutively elapses after the vehicle speed and the accelerator operation amount of the vehicle 100 have become the operating state of the vehicle 100 within the cancellation region R1 in the mode switching map. The predetermined time functions as a cancellation timer for switching the transmission mode from the temporary manual shift mode to the automatic shift mode.

The predetermined time is set to be different according to the transition path through which the vehicle speed and the accelerator operation amount of the vehicle 100 have transitioned into the cancellation region R1 in the mode switching map. In one example, a first predetermined time is set as a return condition for canceling the temporary manual shift mode and returning to the automatic shift mode in response to transition of the vehicle speed and the accelerator operation amount of the vehicle 100 from the first maintenance region R2 to the cancellation region R1.

In addition, a second predetermined time is set as a return condition for canceling the temporary manual shift mode and returning to the automatic shift mode in response to transition of the vehicle speed and the accelerator operation amount of the vehicle 100 from the second maintenance region R3 to the cancellation region R1. In the present embodiment, the first predetermined time and the second predetermined time are set to be different.

In short, the controller 310 cancels the temporary manual shift mode and performs return processing to return to the automatic shift mode after the first predetermined time has elapsed since the transition of the vehicle speed and the accelerator operation amount of the vehicle 100 from the first maintenance region R2 to the cancellation region R1. Moreover, the controller 310 cancels the temporary manual shift mode and performs return processing to return to the automatic shift mode after the second predetermined time has elapsed since the transition of the vehicle speed and the accelerator operation amount of the vehicle 100 from the second maintenance region R3 to the cancellation region R1.

Note that, in the present embodiment, when the vehicle speed and the accelerator operation amount of the vehicle 100 are in the cancellation region R1 from the beginning, instead of transitioning from the first maintenance region R2 or the second maintenance region R3 to the cancellation region R1, the above-mentioned first predetermined time is set as a return condition. Note that this is not the only possible case, and the return condition in the case where the vehicle speed and the accelerator operation amount of the vehicle 100 are in the cancellation region R1 from the beginning may be set to a third predetermined time, which is different from the first predetermined time or the second predetermined time.

Figure 5:
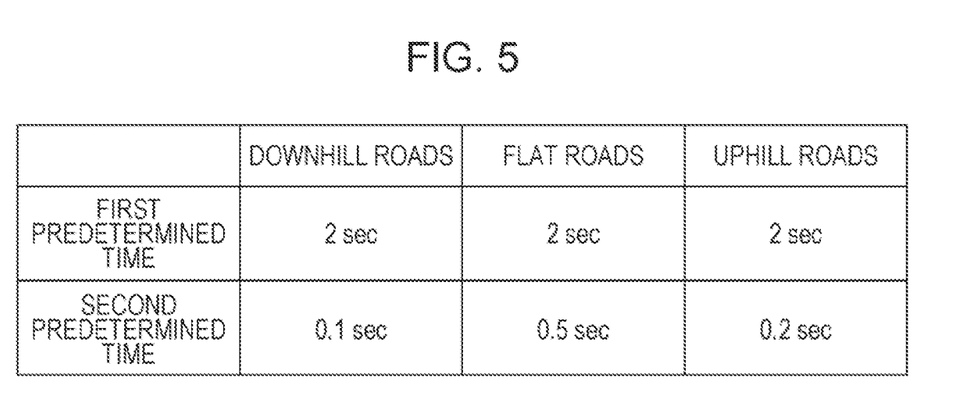
FIG. 5 is a table illustrating a first predetermined time and a second predetermined time according to the present embodiment.

FIG. 5 is a table illustrating the first predetermined time and the second predetermined time according to the present embodiment. Note that the data of the table illustrated in FIG. 5 is stored in the storage unit 320, and the controller 310 is able to read the data illustrated in FIG. 5 from the storage unit 320.

As illustrated in FIG. 5, the first predetermined time is different from and longer than the second predetermined time. In addition, the first predetermined time is set as a constant time regardless of the gradient of the road, and the second predetermined time is set as a time that differs according to the gradient of the road.

In one example, the second predetermined time for flat roads is set to be longer than the second predetermined time for downhill roads and uphill roads. In addition, the second predetermined time for downhill roads is set to be shorter than the second predetermined time for flat roads and uphill roads. Moreover, the second predetermined time for uphill roads is set to be shorter than the second predetermined time for flat roads and longer than the second predetermined time for downhill roads.

The first predetermined time is set to a constant value regardless of the gradient of the road as a waiting time for determining the next operation, because the next operation is not determinable at a time point immediately after the transition of the vehicle speed and the accelerator operation amount of the vehicle 100 from the first maintenance region R2 to the cancellation region R1.

In contrast, the second predetermined time is set to a time shorter than the first predetermined time because it is possible to determine that acceleration has ended at a time point immediately after the transition of the vehicle speed and the accelerator operation amount of the vehicle 100 from the second maintenance region R3 to the cancellation region R1. However, in response to transition of the vehicle speed and the accelerator operation amount of the vehicle 100 from the second maintenance region R3 to the first maintenance region R2 via the cancellation region R1, in order to allow the temporary manual shift mode to be maintained in the first maintenance region R2, the time is set such that the temporary manual shift mode is cancelled at a certain accelerator closing speed or less.

In addition, because the way in which the driver moves the accelerator pedal changes on downhill roads, flat roads, and uphill roads, the time of the cancellation timer is set according to downhill roads, flat roads, and uphill roads. In short, the second predetermined time is set to a value that differs according to the gradient of the road. On downhill roads, because the time that the accelerator pedal can be open is short, the second predetermined time is set to be a time as short as possible. Next, the flow of the operation of the controller 310 when performing a process of returning from the temporary manual shift mode to the automatic shift mode will be described using the mode switching maps illustrated in FIGS. 2 to 4 and the table illustrated in FIG. 5.

Figure 6:
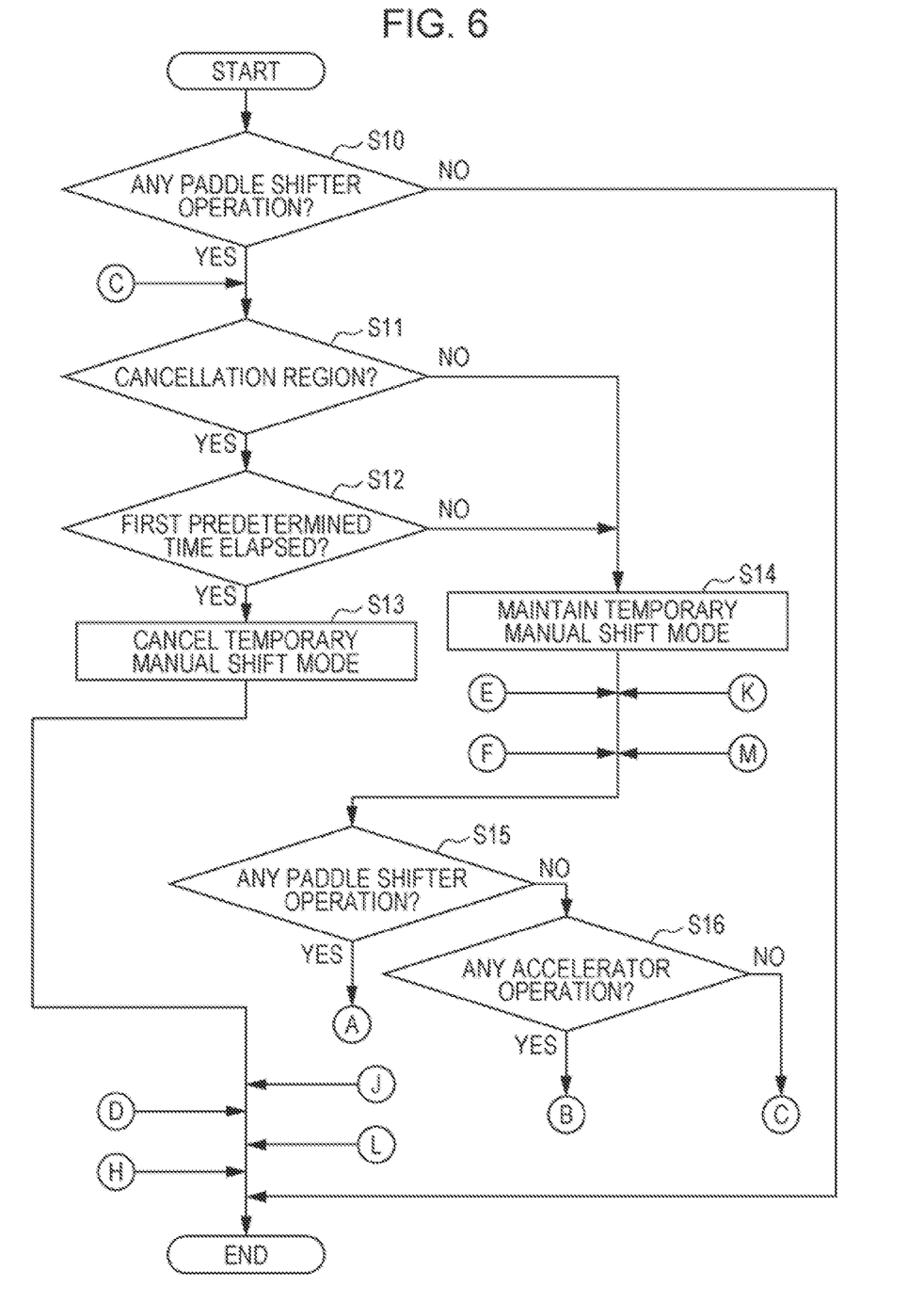
FIG. 6 is a first flowchart illustrating the flow of the operation of a controller.
Figure 7:
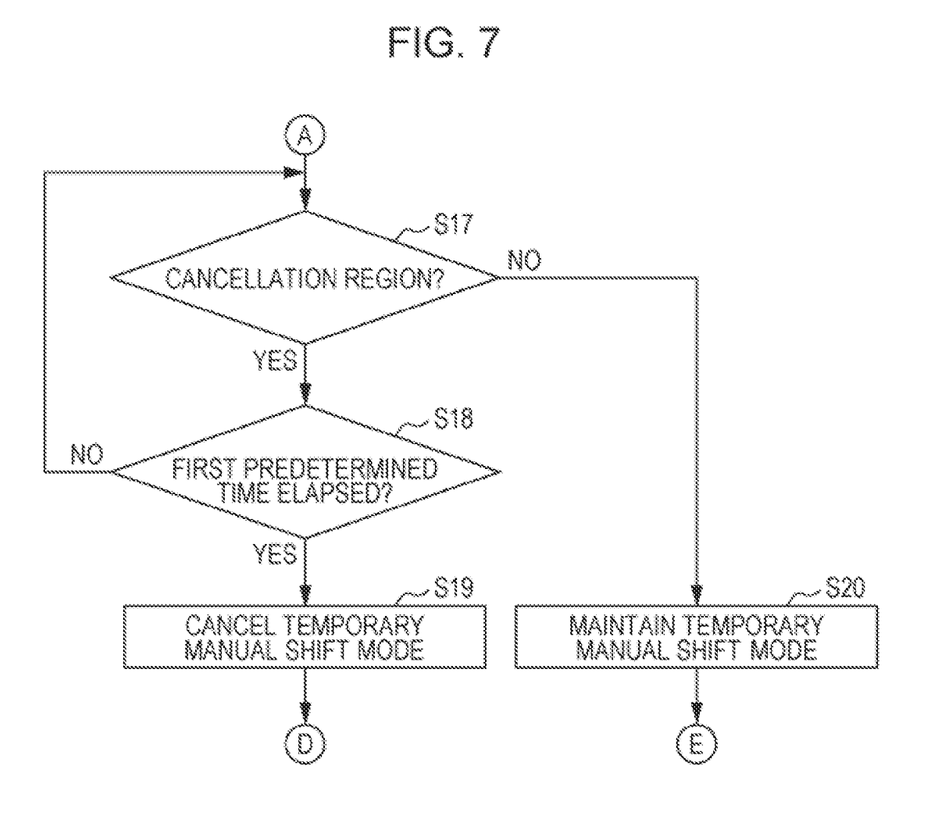
FIG. 7 is a second flowchart illustrating the flow of the operation of the controller.
Figure 8:
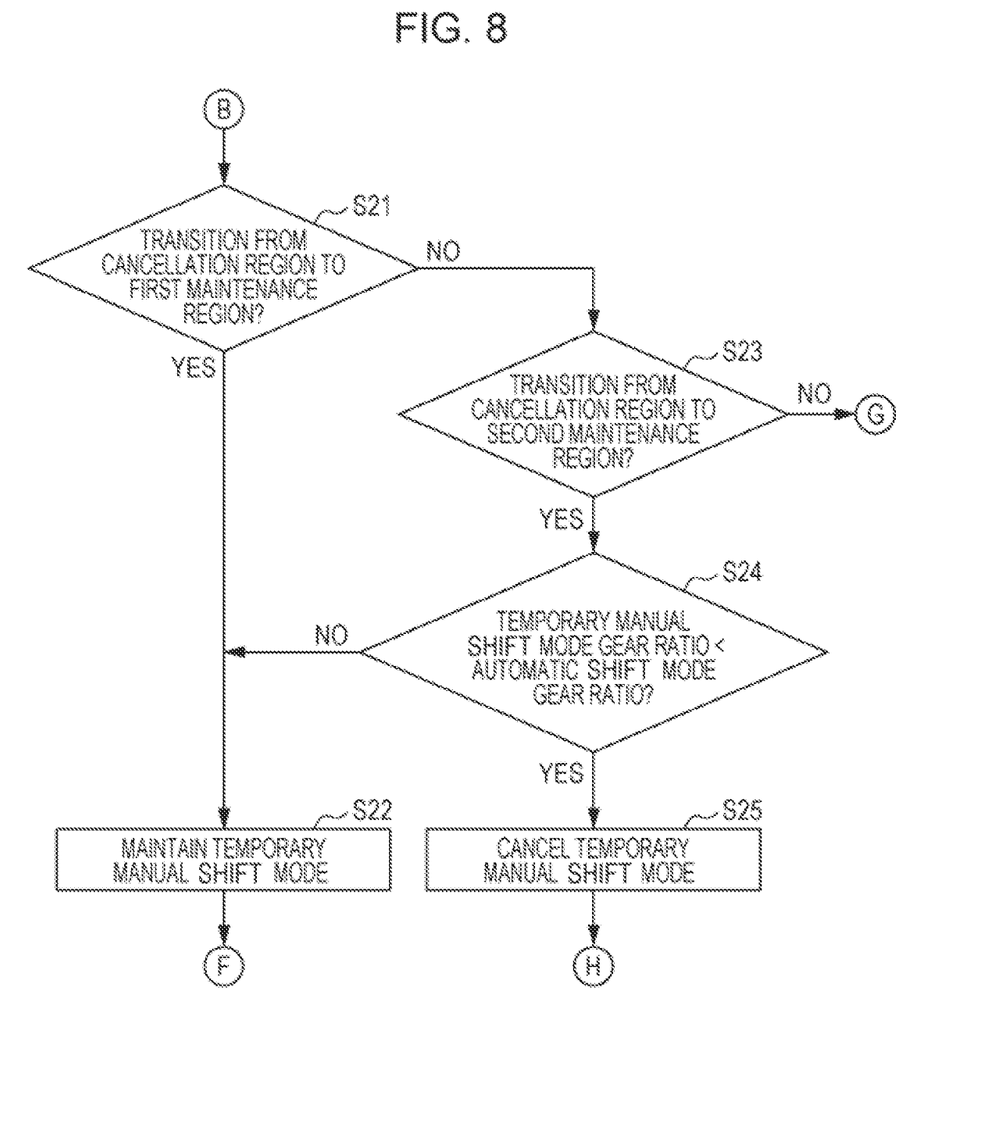
FIG. 8 is a third flowchart illustrating the flow of the operation of the controller.
Figure 9:
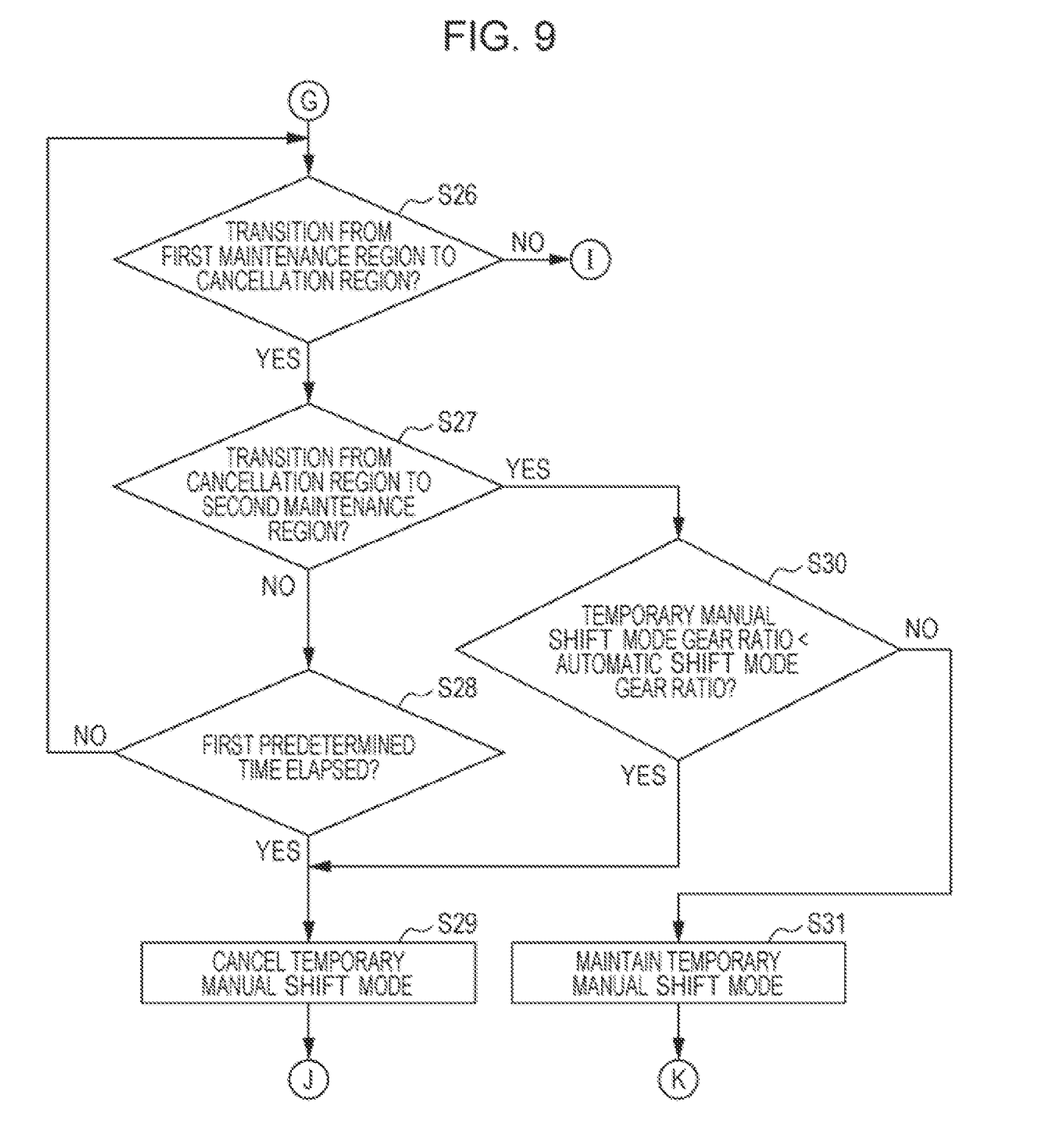
FIG. 9 is a fourth flowchart illustrating the flow of the operation of the controller.
Figure 10:
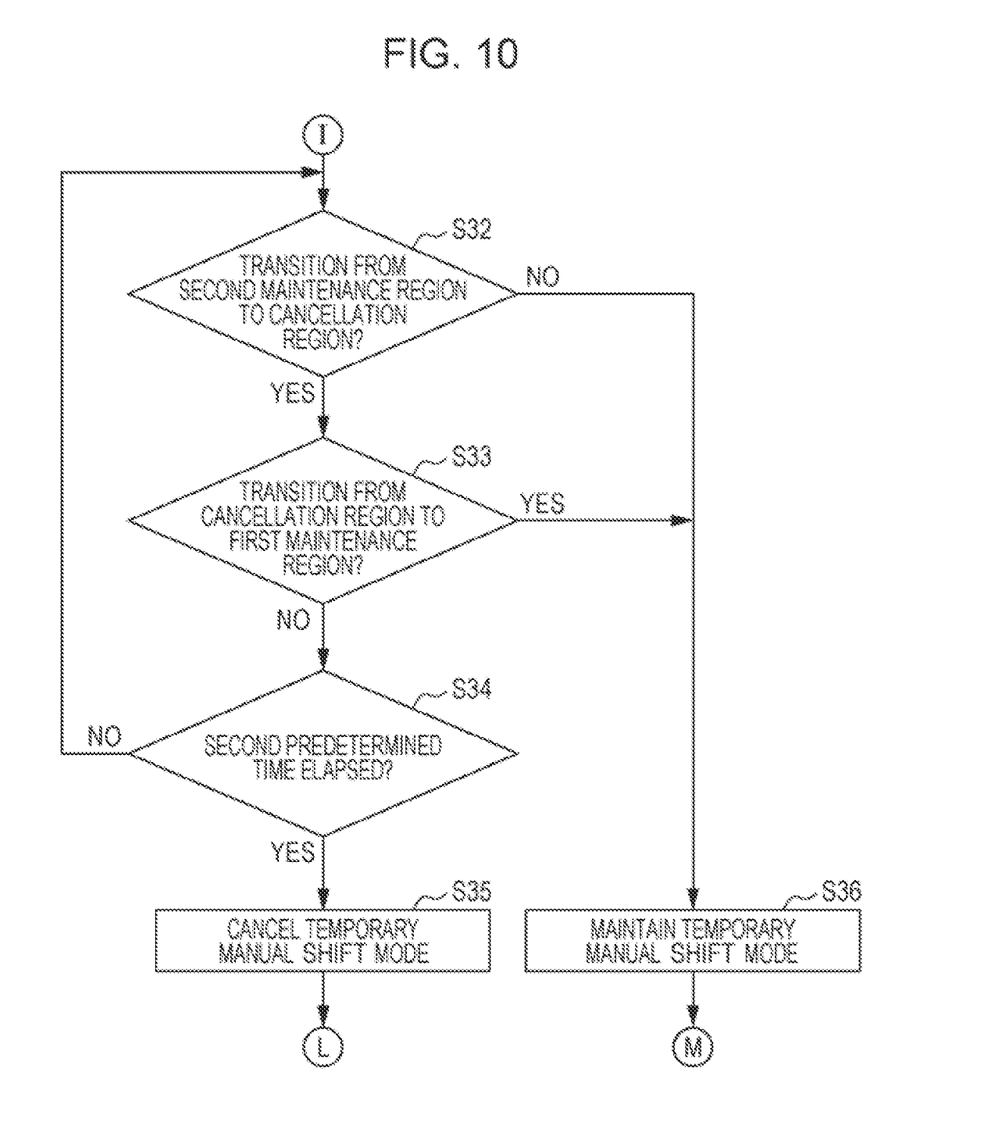
FIG. 10 is a fifth flowchart illustrating the flow of the operation of the controller.

FIG. 6 is a first flowchart illustrating the flow of the operation of the controller 310. FIG. 7 is a second flowchart illustrating the flow of the operation of the controller 310. FIG. 8 is a third flowchart illustrating the flow of the operation of the controller 310. FIG. 9 is a fourth flowchart illustrating the flow of the operation of the controller 310. FIG. 10 is a fifth flowchart illustrating the flow of the operation of the controller 310. In the automatic shift mode, the controller 310 executes a series of processes in FIGS. 6 to 10 at certain interruption time points that come at certain control cycles.

As illustrated in FIG. 6, at a certain interruption time point, the controller 310 determines whether an upshift or downshift operation of the paddle shifter has been performed based on the detection result of the paddle shifter sensor 370 (S10).

When an upshift or downshift operation has been performed (YES in S10), the controller 310 determines whether the vehicle speed and the accelerator operation amount of the vehicle 100 are within the cancellation region R1 in the mode switching map (S11). In contrast, if no upshift or downshift operation has been performed (NO in S10), the controller 310 ends the series of processes.

At this time, the controller 310 estimates the gradient of the road on which the vehicle 100 drives based on the detection result of the gradient sensor 350, and selects a mode switching map corresponding to the estimated gradient from the multiple types of mode switching maps stored in the storage unit 320.

Then, based on the selected mode switching map and the vehicle speed and the accelerator operation amount of the vehicle 100, the controller 310 determines whether the vehicle speed and the accelerator operation amount of the vehicle 100 are within the cancellation region R1 in the mode switching map.

When the vehicle speed and the accelerator operation amount of the vehicle 100 are within the cancellation region R1 (YES in S11), the controller 310 determines whether the first predetermined time has elapsed (S12). Then, when the first predetermined time has elapsed (YES in S12), the controller 310 cancels the temporary manual shift mode (S13), executes return processing to return to the automatic shift mode, and ends the series of processes.

In contrast, when the vehicle speed and the accelerator operation amount of the vehicle 100 are not within the cancellation region R1 (NO in S11), or when the first predetermined period has not elapsed (NO in S12), the controller 310 performs processing to maintain the temporary manual shift mode (S14).

After that, the controller 310 determines whether an upshift or downshift operation of the paddle shifter has been performed based on the detection result of the paddle shifter sensor 370 (S15).

When an upshift or downshift operation has been performed (YES in S15), as illustrated in FIG. 7, the controller 310 determines whether the vehicle speed and the accelerator operation amount of the vehicle 100 are within the cancellation region R1 in the mode switching map (S17).

In contrast, when no upshift or downshift operation has been performed (NO in S15), as illustrated in FIG. 6, the controller 310 determines whether the driver has performed an accelerator operation based on the detection result of the accelerator operation amount sensor 330 (S16). The processing in S16 will be described later.

When the vehicle speed and the accelerator operation amount of the vehicle 100 are within the cancellation region R1 (YES in S17), the controller 310 determines whether the first predetermined time has elapsed (S18). Then, when the first predetermined time has elapsed (YES in S18), the controller 310 cancels the temporary manual shift mode (S19), executes return processing to return to the automatic shift mode, and ends the series of processes. In contrast, when the first predetermined time has not elapsed (NO in S18), the controller 310 repeatedly executes the processing in S17 and S18.

In the meantime, when the vehicle speed and the accelerator operation amount of the vehicle 100 are not within the cancellation region R1 (NO in S17), the controller 310 performs processing to maintain the temporary manual shift mode (S20), and then proceeds to the processing in S15 again.

When the driver has performed an accelerator operation (YES in S16), as illustrated in FIG. 8, the controller 310 determines whether the vehicle speed and the accelerator operation amount of the vehicle 100 have transitioned from the cancellation region R1 to the first maintenance region R2 (S21).

In the case of transition from the cancellation region R1 to the first maintenance region R2 (YES in S21), the controller 310 performs processing to maintain the temporary manual shift mode (S22), and then proceeds to the processing in S15 again.

In contrast, in the case of no transition from the cancellation region R1 to the first maintenance region R2 (NO in S21), the controller 310 determines whether the vehicle speed and the accelerator operation amount of the vehicle 100 have transitioned from the cancellation region R1 to the second maintenance region R3 (S23).

In the case of transition from the cancellation region R1 to the second maintenance region R3 (YES in S23), the controller 310 determines whether the gear ratio of the transmission 200 set by the driver in the temporary manual shift mode is less than the gear ratio of the transmission 200 automatically controlled in the automatic shift mode (S24). Hereinafter, the gear ratio of the transmission 200 set by the driver in the temporary manual shift mode will be referred to as a temporary manual shift mode gear ratio, and the gear ratio of the transmission 200 automatically controlled in the automatic shift mode will be referred to as an automatic shift mode gear ratio.

When the temporary manual shift mode gear ratio is less than the automatic shift mode gear ratio (YES in S24), the controller 310 cancels the temporary manual shift mode (S25), executes return processing to return to the automatic shift mode, and ends the series of processes. In contrast, when the temporary manual shift mode gear ratio is greater than or equal to the automatic shift mode gear ratio (NO in S24), the controller 310 proceeds to the processing in S22.

In contrast, in the case of no transition from the cancellation region R1 to the second maintenance region R3 (NO in S23), as illustrated in FIG. 9, the controller 310 determines whether the vehicle speed and the accelerator operation amount of the vehicle 100 have transitioned from the first maintenance region R2 to the cancellation region R1 (S26).

In the case of transition from the first maintenance region R2 to the cancellation region R1 (YES in S26), the controller 310 determines whether the vehicle speed and the accelerator operation amount of the vehicle 100 have transitioned further from the cancellation region R1 to the second maintenance region R3 (S27).

In the case of no transition from the cancellation region R1 to the second maintenance region R3 (NO in S27), the controller 310 determines whether the first predetermined time has elapsed (S28). When the first predetermined time has elapsed (YES in S28), the controller 310 cancels the temporary manual shift mode (S29), executes return processing to return to the automatic shift mode, and ends the series of processes. In contrast, when the first predetermined time has not elapsed (NO in S28), the controller 310 repeatedly performs the processing in S26 to S28.

In the meantime, in the case of transition from the cancellation region R1 to the second maintenance region R3 (YES in S27), the controller 310 determines whether the temporary manual shift mode gear ratio is less than the automatic shift mode gear ratio (S30).

When the temporary manual shift mode gear ratio is less than the automatic shift mode gear ratio (YES in S30), the controller 310 proceeds to the processing in S29. In contrast, when the temporary manual shift mode gear ratio is greater than or equal to the automatic shift mode gear ratio (NO in S30), the controller 310 performs processing to maintain the temporary manual shift mode (S31), and proceeds to the processing in S15 again.

In the case of no transition from the first maintenance region R2 to the cancellation region R1 (NO in S26), as illustrated in FIG. 10, the controller 310 determines whether the vehicle speed and the accelerator operation amount of the vehicle 100 have transitioned from the second maintenance region R3 to the cancellation region R1 (S32).

In the case of transition from the second maintenance region R3 to the cancellation region R1 (YES in S32), the controller 310 determines whether the vehicle speed and the accelerator operation amount of the vehicle 100 have further transitioned from the cancellation region R1 to the first maintenance region R2 (S33).

In the case of no transition from the cancellation region R1 to the first maintenance region R2 (NO in S33), the controller 310 determines whether the second predetermined time has elapsed (S34). At this time, the controller 310 estimates the gradient of the road on which the vehicle 100 drives based on the detection result of the gradient sensor 350, and selects the second predetermined time corresponding to the estimated gradient from the table illustrated in FIG. 5 stored in the storage unit 320. Then, the controller 310 determines whether the second predetermined time has elapsed based on the selected second predetermined time.

When the second predetermined time has elapsed (YES in S34), the controller 310 cancels the temporary manual shift mode (S35), executes return processing to return to the automatic shift mode, and ends the series of processes. In contrast, when the second predetermined time has not elapsed (NO in S34), the controller 310 repeatedly performs the processing in S32 to S34.

In the case of no transition from the second maintenance region R3 to the cancellation region R1 (NO in S32), or in the case of transition from the cancellation region R1 to the first maintenance region R2 (YES in S33), the controller 310 performs processing to maintain the temporary manual shift mode (S36), and proceeds to the processing in S15 again.

According to the present embodiment thus far, the controller 310 estimates the gradient of the road on which the vehicle 100 drives, and switches the transmission mode of the transmission 200 based on a mode switching map corresponding to the estimated gradient and the vehicle speed and the accelerator operation amount of the vehicle 100. This makes it possible to set a region where the temporary manual shift mode is maintained or canceled in accordance with the driving state of the vehicle 100, such as driving on an uphill road, driving on a flat road, or driving on a downhill road, and return processing to return from the temporary manual shift mode to the automatic shift mode so as to match the driver's sensitivity can be performed.

In addition, according to the present embodiment, the first predetermined time and the second predetermined time, as a cancellation timer when the vehicle speed and the accelerator operation amount of the vehicle 100 transition from the first maintenance region R2 or the second maintenance region R3 to the cancellation region R1, are set to times that are different from each other. In one embodiment, the first predetermined time is set to be longer than the second predetermined time. In addition, the second predetermined time is set to a value that differs according to the gradient of the road. This makes it possible to perform return processing to return from the temporary manual shift mode to the automatic shift mode so as to match the driver's sensitivity in accordance with the driving state of the vehicle 100.

In addition, according to the present embodiment, when the automatic shift mode gear ratio is greater than the temporary manual shift mode gear ratio in the second maintenance region R3, the controller 310 cancels the temporary manual shift mode and performs return processing to switch to the automatic shift mode. This makes it possible to improve the acceleration of the vehicle 100.

Although the embodiment of the disclosure has been described above with reference to the accompanying drawings, it goes without saying that the disclosure is not limited to the embodiment. It is clear for those skilled in the art to be able to conceive of various changes or modifications within the scope described in the claims, and it is understood that they also naturally fall within the technical scope of the disclosure.

For example, although the example in which the first predetermined time and the second predetermined time are set to different times has been described in the above embodiment, this is not the only possible case, and the first predetermined time and the second predetermined time may be set to the same time. In addition, although the example in which there are only three types of mode switching maps has been described in the above embodiment, this is not the only possible case. For example, there may be two types of mode switching maps, one for uphill roads and the other for downhill roads. Alternatively, there may be five types of mode switching maps, one for uphill roads with steep gradients, one for uphill roads with moderate gradients, one for flat roads, one for downhill roads with moderate gradients, and one for downhill roads with steep gradients. In any case, if there are two or more mode switching maps, any types of maps may be set.

In addition, the example in which the first predetermined time is set to a constant value regardless of the gradient of the road, and the second predetermined time is set to a value that differs according to the gradient of the road has been described in the above embodiment. However, this is not the only possible case, and, for example, the first predetermined time may be set to a value that differs according to the gradient of the road, and the second predetermined time may be set to a constant value regardless of the gradient of the road.

In addition, the example in which, when the vehicle speed and the accelerator operation amount of the vehicle 100 are in the second maintenance region R3, if the automatic shift mode gear ratio is greater than the temporary manual shift mode gear ratio, return processing is performed has been described in the above embodiment. However, this is not the only possible case, and, when the vehicle speed and the accelerator operation amount of the vehicle 100 are in the second maintenance region R3, the temporary manual shift mode may be maintained without performing return processing.

According to the disclosure, processing can be performed to switch the transmission mode so as to match the driver's sensitivity.

The control apparatus 300 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control apparatus 300. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A control apparatus comprising:
   a controller configured to switch a transmission mode of a transmission of a vehicle between an automatic shift mode in which a gear ratio of the transmission is automatically controlled and a temporary manual shift mode in which the gear ratio of the transmission is temporarily shifted in response to an operation performed by a driver who drives the vehicle; and
   a storage unit configured to store multiple types of maps each representing a relationship between a vehicle speed and an accelerator operation amount of the vehicle that are parameters for switching the transmission mode, the multiple types of maps being set for individual gradients of roads on which the vehicle drives,
   wherein the multiple types of maps each include
      a cancellation region representing a range of vehicle speeds and accelerator operation amounts at which the temporary manual shift mode is canceled,
      a first maintenance region that is a region on a side where accelerator operation amounts are less than the cancellation region and that represents a range of vehicle speeds and accelerator operation amounts at which the temporary manual shift mode is maintained, and
      a second maintenance region that is a region on a side where accelerator operation amounts are greater than the cancellation region and that represents a range of vehicle speeds and accelerator operation amounts at which the temporary manual shift mode is maintained,
   the cancellation region, the first maintenance region, and the second maintenance region in each of the multiple types of maps are set to be different from each other according to the gradients,
   the controller comprises
      one or more processors, and
      one or more memories coupled to the one or more processors, and
   the one or more processors execute a process comprising selecting a type of map, from the multiple types of maps, corresponding to a gradient, of the individual gradients, of a road on which the vehicle is driving, and
      switching the transmission mode of the transmission based on the selected type of map, the vehicle speed and the accelerator operation amount.

2. The control apparatus according to claim 1, wherein the cancellation region in each of the multiple types of maps is set based on the gradient and a road load opening degree that is the accelerator operation amount at which the vehicle speed is constant.

3. The control apparatus according to claim 2, wherein:
   the one or more processors are configured to
      cancel the temporary manual shift mode after a first predetermined time has elapsed since transition of the vehicle speed and the accelerator operation amount of the vehicle from the first maintenance region to the cancellation region, and
      cancel the temporary manual shift mode after a second predetermined time has elapsed since transition of the vehicle speed and the accelerator operation amount of the vehicle from the second maintenance region to the cancellation region; and
   the first predetermined time is set to be longer than the second predetermined time.

4. The control apparatus according to claim 2, wherein:
   the one or more processors are configured to
      cancel the temporary manual shift mode after a first predetermined time has elapsed since transition of the vehicle speed and the accelerator operation amount of the vehicle from the first maintenance region to the cancellation region, and
      cancel the temporary manual shift mode after a second predetermined time has elapsed since transition of the vehicle speed and the accelerator operation amount of the vehicle from the second maintenance region to the cancellation region;
   the first predetermined time is set to a constant value regardless of the gradient; and
   the second predetermined time is set to a value that differs according to the gradient.

5. The control apparatus according to claim 2, wherein:
   the one or more processors are configured to
      cancel the temporary manual shift mode and switch to the automatic shift mode when, in response to transition of the vehicle speed and the accelerator operation amount of the vehicle from the first maintenance region or the cancellation region to the second maintenance region, a gear ratio automatically set in the automatic shift mode is greater than a gear ratio set in the temporary manual shift mode.

6. The control apparatus according to claim 1, wherein:
   the one or more processors are configured to
      cancel the temporary manual shift mode after a first predetermined time has elapsed since transition of the vehicle speed and the accelerator operation amount of the vehicle from the first maintenance region to the cancellation region, and
      cancel the temporary manual shift mode after a second predetermined time has elapsed since transition of the vehicle speed and the accelerator operation amount of the vehicle from the second maintenance region to the cancellation region; and
   the first predetermined time is set to be longer than the second predetermined time.

7. The control apparatus according to claim 1, wherein:
the one or more processors are configured to
- cancel the temporary manual shift mode after a first predetermined time has elapsed since transition of the vehicle speed and the accelerator operation amount of the vehicle from the first maintenance region to the cancellation region, and
- cancel the temporary manual shift mode after a second predetermined time has elapsed since transition of the vehicle speed and the accelerator operation amount of the vehicle from the second maintenance region to the cancellation region;

the first predetermined time is set to a constant value regardless of the gradient; and the second predetermined time is set to a value that differs according to the gradient.

8. The control apparatus according to claim 1, wherein:
the one or more processors are configured to
- cancel the temporary manual shift mode and switch to the automatic shift mode when, in response to transition of the vehicle speed and the accelerator operation amount of the vehicle from the first maintenance region or the cancellation region to the second maintenance region, a gear ratio automatically set in the automatic shift mode is greater than a gear ratio set in the temporary manual shift mode.

* * * * *